United States Patent
Lowery et al.

(10) Patent No.: US 10,202,492 B2
(45) Date of Patent: Feb. 12, 2019

(54) POLYETHERIMIDE SULFONE COMPOSITIONS, METHOD OF MANUFACTURE, AND ARTICLES PREPARED THEREFROM

(71) Applicant: SABIC Global Technologies B.V., Bergen op Zoom (NL)

(72) Inventors: Daniel Francis Lowery, Mount Vernon, IN (US); Kelly Leung, Evansville, IN (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 15/749,926

(22) PCT Filed: Aug. 1, 2016

(86) PCT No.: PCT/US2016/044972
§ 371 (c)(1),
(2) Date: Feb. 2, 2018

(87) PCT Pub. No.: WO2017/027238
PCT Pub. Date: Feb. 16, 2017

(65) Prior Publication Data
US 2018/0223044 A1   Aug. 9, 2018

Related U.S. Application Data

(60) Provisional application No. 62/202,467, filed on Aug. 7, 2015.

(51) Int. Cl.
*C08L 79/08* (2006.01)
*C08G 73/10* (2006.01)

(52) U.S. Cl.
CPC ..... *C08G 73/1064* (2013.01); *C08G 73/1046* (2013.01); *C08L 79/08* (2013.01); *C08L 2205/025* (2013.01)

(58) Field of Classification Search
None
See application file for complete search history.

(56) References Cited

U.S. PATENT DOCUMENTS

2015/0087767 A1* 3/2015 Moniruzzannan ...... C08L 71/00
524/538

FOREIGN PATENT DOCUMENTS

| WO | 2009105377 A2 | 8/2009 |
| WO | 2015042253 A1 | 3/2015 |

OTHER PUBLICATIONS

International Search Report for International Application No. PCT/US2016/044972; International Filing Date: Aug. 1, 2016; dated Oct. 12, 2016; 5 pages.
Written Opionion of the International Searching Authority for International Application No. PCT/US2016/044972; International Filing Date: Aug. 1, 2016; dated Oct. 12, 2016; 5 pages.

* cited by examiner

*Primary Examiner* — Ana L. Woodward
(74) *Attorney, Agent, or Firm* — Cantor Colburn LLP

(57) ABSTRACT

A thermoplastic composition is described herein including a first polyetherimide sulfone having a glass transition temperature of 250 to 290° C., and a second polyetherimide sulfone having a glass transition temperature of 230 to 249° C. The composition has an advantageous combination of optical properties including improved yellowness index, transmission, and haze. A method of manufacturing the thermoplastic composition and articles including the thermoplastic composition are also described. A method for improving the optical properties of a thermoplastic composition is also disclosed, where the method includes melt mixing the first and second polyetherimide sulfones, each having a glass transition temperature as defined herein. The method provides a composition having at least one of improved yellowness, haze, and transmission.

20 Claims, No Drawings

ND ARTICLES
POLYETHERIMIDE SULFONE COMPOSITIONS, METHOD OF MANUFACTURE, AND ARTICLES PREPARED THEREFROM

CROSS-REFERENCE TO RELATED APPLICATIONS

This application is a National Stage application of PCT/US2016/044972, filed Aug. 1, 2016, which claims the benefit of U.S. Provisional Application No. 62/202,467, filed Aug. 7, 2015, both of which are incorporated by reference herein in their entirety.

BACKGROUND

Various inorganic glasses have been conventionally used for optical lens applications. However, the need for a lighter and thinner lens has prompted the research and development of polymer-containing optical lenses. Polymer-containing optical components are lightweight, robust, have good formability, and can be produced on a large scale to meet increasing consumer demands.

Polymer-containing optical materials can find use as eyeglass lenses, as well as microlenses (e.g., for optical information communication), coating materials for an optical device, or core materials for an optical fiber. Manufacturing such products typically requires exposure to high temperatures; therefore a polymer having a high heat resistance is necessary in order to withstand the processing steps. For example, polymer microlenses are required to retain their shape at temperatures in excess of 240° C., since laser transmitter/transceiver modules are exposed to high temperatures during their placement on printed circuit boards by a solder re-flow process or a solder bath, especially lead-free solder processes. For this reason, only polymers with high glass transition temperatures can be used. In addition, to satisfy the requirements of various optical applications, these polymers have to be transparent with high transmission, specifically in the range of 600 nm to 1600 nanometers (nm).

Several classes of high heat polymers are known in the art. Polyetherimides are known for high heat distortion temperatures and high glass transition temperatures that make their use as coatings, molded articles, composites, and the like very attractive where high temperature resistance is desired. As such, these polymers have found wide use in shaped articles, sheet materials, and coatings for use in challenging physical environments such as aerospace applications, lighting applications, and automotive applications. Due to their high glass transition temperature and high melt viscosity, however, polyetherimides can be difficult to process into finished products.

Thermoplastic polyimides comprising sulfone linkages are also well known to withstand high temperatures while maintaining high transparency. The use of polyetherimide sulfones has been limited, however, due to poor melt processability as well as the high cost stemming from the expensive monomers required for their synthesis.

Despite the high heat polymers that are currently known, there remains a continuing need in the art for a high heat polymer composition having good thermal properties in combination with good optical properties (e.g., high heat polymer compositions that are optically transparent) to overcome the above-described technical limitations. A high heat polymer having a good balance of properties, including improved optical properties, is desirable for use in optical applications.

BRIEF DESCRIPTION

A thermoplastic composition comprises, based on the total weight of the thermoplastic composition, 10 to 90 wt. %, preferably 25 to 90 wt. %, more preferably 50 to 90 wt. % of a first polyetherimide sulfone having a glass transition temperature of 250 to 290° C., preferably 260 to 270° C.; and 10 to 90 wt. %, preferably 10 to 75 wt. %, more preferably 10 to 50 wt. % of a second polyetherimide sulfone having a glass transition temperature of 230 to 249° C., preferably 240 to 249° C.; wherein the composition has the following properties: a melt index of 0.7 to 2 grams per minute, preferably 0.95 to 1.8 grams per minute, more preferably 0.95 to 1.2 grams per minute, determined according to ASTM D1238 at 367° C. under a 6.7 kilogram load; a glass transition temperature of 231 to 289° C., preferably 240 to 266° C., more preferably 245 to 262; a yellowness index of less than or equal to 200, preferably 140 to 200, more preferably 150 to 195, determined according to ASTM D1925; a transmission of greater than or equal to 4%, preferably 4.5 to 25%, more preferably 6 to 20%, determined according to ASTM D1003; and a haze of less than or equal to 12%, preferably 5 to 11% more preferably 6 to 10%, determined according to ASTM D1003.

A method of manufacturing the thermoplastic composition comprises melt-mixing the components; and extruding the components.

An article comprising the thermoplastic composition is also described.

A method for improving the optical properties of a thermoplastic composition comprises melt-mixing 10 to 90 wt. %, preferably 25 to 90 wt. %, more preferably 50 to 90 wt. % of a first polyetherimide sulfone having a glass transition temperature of 250 to 290° C., preferably 260 to 270° C.; and 10 to 90 wt. %, preferably 10 to 75 wt. %, more preferably 10 to 50 wt. % of a second polyetherimide sulfone having a glass transition temperature of 230 to 249° C., preferably 240 to 249° C.; to provide a thermoplastic composition having a glass transition temperature of 231 to 289° C., preferably 240 to 266° C., more preferably 245 to 262° C., and a melt index of 0.7 to 2 grams per minute, preferably 0.95 to 1.8 grams per minute, more preferably 0.95 to 1.2 grams per minute determined according to ASTM D1238 at 367° C. under a 6.7 kilogram load; and one or more of the following optical properties: a yellowness index of less than or equal to 200, preferably 140 to 200, more preferably 150 to 195, determined according to ASTM D1925; a transmission of greater than or equal to 4%, preferably 5 to 25%, more preferably 6 to 20%, determined according to ASTM D1003; and a haze of less than or equal to 12%, preferably 5 to 11% more preferably 6 to 10%, determined according to ASTM D1003.

The above described and other features are exemplified by the following Detailed Description.

DETAILED DESCRIPTION

Disclosed herein is a thermoplastic composition comprising a first polyetherimide sulfone and a second polyetherimide sulfone, selected such that the composition has an advantageous combination of thermal properties and optical properties. The present inventors have unexpectedly found that compositions including a recycled polyetherimide sulfone component can provide a composition having the desired properties when blended with certain virgin polyetherimide sulfones. The compositions can be particularly useful for the preparation of articles requiring enhanced optical properties (e.g., high near-infrared (NIR) transmission).

Thus one aspect of the present disclosure is a thermoplastic composition comprising a first polyetherimide sulfone and a second polyetherimide sulfone. The first and second polyetherimide sulfones each independently comprise more than 1, for example 10 to 1000, or 10 to 500, structural units of the formula

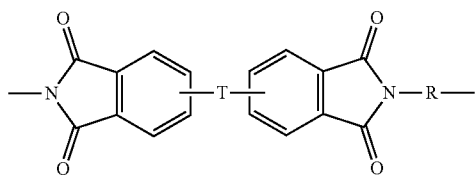

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of the formula

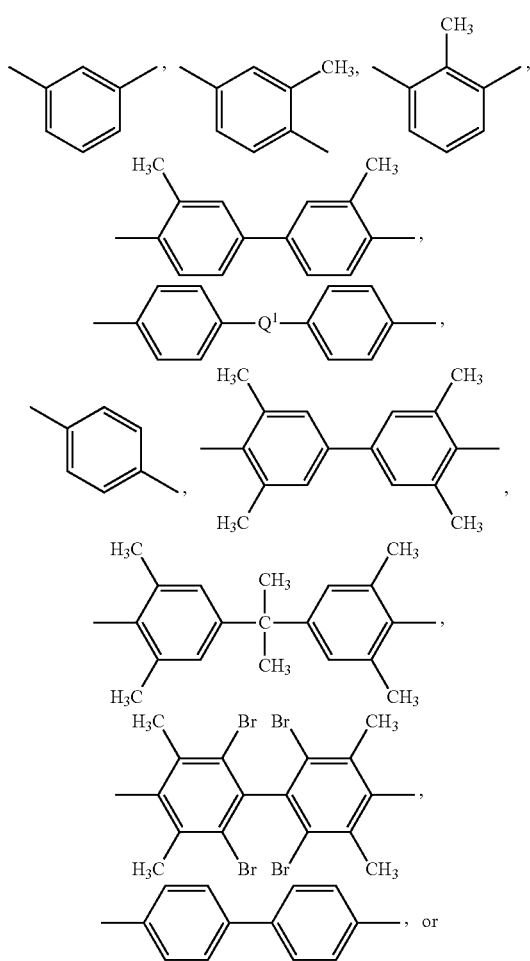

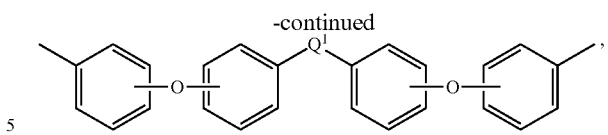

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. At least 10 mole percent of the R groups comprise a sulfone group, for example, at least 20% of the R groups comprise a sulfone group, for example at least 50% of the R groups comprise a sulfone group. In an embodiment, R is 4,4'-diphenylene sulfone.

The group T is —O— or a group of the formula —O—Z—O— wherein the divalent bonds of the —O— or the —O—Z—O— group are in the 3,3', 3,4', 4,3', or the 4,4' positions. The group Z in —O—Z—O— is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of the formula

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —SO$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of the formula

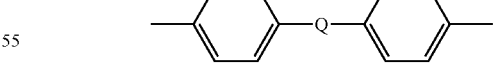

wherein Q is —O—, —S—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in the above formula is 2,2-isopropylidene.

The polyetherimide sulfones optionally comprise up to 10 mole percent (mole %), up to 5 mole %, or up to 2 mole % of units of the above formula wherein T is a tetravalent linker of the formula

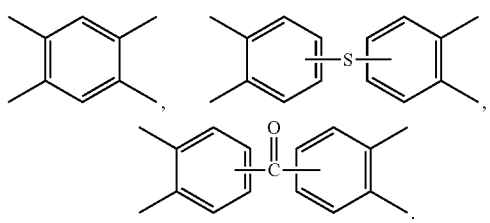

In some embodiments no units are present wherein R is of these formulas.

In an embodiment, R is 4,4'-diphenylene sulfone, and T is —O—Z—O— wherein Z is a divalent group derived from the above described dihydroxy compound. In an embodiment, R is 4,4'-diphenylene sulfone and T is —O—Z—O— wherein Z is 4,4'-diphenylene isopropylidene.

The polyetherimide sulfone can be prepared by any of the methods well known to those skilled in the art, including the reaction of an aromatic bis(ether anhydride) of the formula

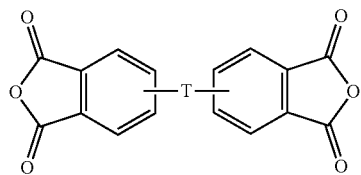

with an organic diamine of the formula

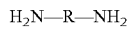

wherein T and R are defined as described above.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

In some embodiments, the polyetherimide sulfone can be prepared by reacting a salt of a dihydroxy-substituted aromatic hydrocarbon of the formula HO-A-OH in the presence of a catalyst with a substituted aromatic bisimide compound of the formula

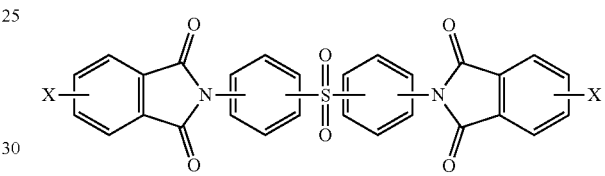

wherein A is a divalent aromatic group, preferably a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. X is a halogen or nitro group, preferably a halogen, more preferably chloride. In some embodiments, A is 4,4'-diphenylene isopropylidene, and the salt of the dihydroxy-substituted aromatic hydrocarbon is the salt of 4,4'-dihydroxy-2,2-diphenylpropane (bisphenol A), for example the disodium salt of bisphenol A. In some embodiments, the catalyst is a guanidinium salt.

The polyetherimide sulfone can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide sulfone has a weight average molecular weight ($M_w$) of 1,000 to 150,000 Daltons (Da), as measured by gel permeation chromatography, using polystyrene standards. In some embodiments the polyetherimide has an $M_w$ of 5,000 to 80,000 Da, specifically, 20,000 to 60,000 Da. Such polyetherimide polymers can have an intrinsic viscosity greater than 0.2 deciliters per gram (dl/g), or, more specifically, 0.35 to 0.7 dl/g as measured in m-cresol at 25° C.

The first polyetherimide sulfone has a glass transition temperature of 250 to 290° C., preferably 260 to 270° C. The second polyetherimide sulfone has a glass transition temperature of 230 to 249° C., preferably 240 to 249° C.

In some embodiments, the first polyetherimide sulfone is a recycled polyetherimide sulfone. The term "recycled" as used herein refers to a component that has been manufactured and either used or otherwise intended for scrap. For example, recycled polyetherimide sulfone can include post-consumer waste polyetherimide sulfone and scrap polyetherimide sulfone, for example polyetherimide sulfone trimmed from molded articles, or articles that have been rejected due to imperfections. In some embodiments, the recycled polyetherimide sulfone includes molded article that have been used, for example sprues and runners molded from polyetherimide sulfone and used in a manufacturing process. In some embodiments, the recycled polyetherimide sulfone can be recovered and used in reground form. In some embodiments, the recycled polyetherimide sulfone can be recovered, reground, and further repelletized. In some embodiments, the second polyetherimide sulfone is preferably a virgin polyetherimide sulfone.

The first polyetherimide sulfone can be present in the thermoplastic composition in an amount of 10 to 90 weight percent (wt. %), preferably 25 to 90 wt. %, more preferably 50 to 90 wt. %, based on the total weight of the thermoplastic composition. The second polyetherimide sulfone can be present in the thermoplastic composition in an amount of 10 to 90 wt. %, preferably 10 to 75 wt. %, more preferably 10 to 50 wt. %, based on the total weight of the thermoplastic composition.

In some embodiments, in addition to the first and second polyetherimide sulfones, the thermoplastic composition can optionally comprise one or more additives selected to achieve a desired property, with the proviso that the one or more additives are also selected so as to not significantly adversely affect a desired property of the thermoplastic composition. The one or more additives can be mixed at a suitable time during the mixing of the components for forming the composition. For example, the thermoplastic composition can optionally further comprise one or more additives comprising a thermal stabilizer, a flame retardant, a hydrolysis stabilizer, an ultraviolet light stabilizer, a nucleating agent, a metal deactivator, a colorant, an antioxidant, or a combination comprising at least one of the foregoing. In general, the additives are used in the amounts generally known to be effective. For example, the total amount of the one or more additives can be 0.001 to 10.0 wt. %, or 0.01 to 5 wt. %, each based on the total weight of the polymers in the composition.

The thermoplastic composition can be prepared according to any method that is generally known. In some embodiments, the thermoplastic composition is prepared by melt-mixing or a combination of dry-blending and melt-mixing. Melt-mixing can be performed in single or twin screw type extruders or similar mixing devices which can apply a shear and heat to the components. Melt-mixing can be performed at temperatures greater than or equal to the melting temperatures of the polymer components and less than the degradation temperatures of either of the polymer components. All of the ingredients can be added initially to the processing system. In some embodiments, the ingredients can be added sequentially or through the use of one or more master batches. It can be advantageous to apply a vacuum to the melt through one or more vent ports in the extruder to remove volatile impurities in the composition. In some embodiments the composition is the product of melt-mixing the polymers and, when present, any additives.

In an exemplary embodiment, compounding is performed using a Toshiba TEM-37BS twin screw extruder. The compositions can be injection molded using a 180 ton Demag injection molding machine following drying of the compounded pellets.

The thermoplastic compositions can have a desirable combination of properties.

The thermoplastic composition can have a melt index of 0.7 to 2 grams per minute, preferably 0.95 to 1.8 grams per minute, more preferably 0.95 to 1.2 grams per minute, determined according to ASTM D1238 at 367° C. using a 6.7 kilogram load.

The thermoplastic composition can have a glass transition temperature (Tg) of 231 to 289° C., preferably 240 to 266° C., more preferably 245 to 262° C.

The thermoplastic composition can have a yellowness index of less than or equal to 200, preferably 140 to 200, more preferably 150 to 195, determined according to ASTM D1925.

The thermoplastic composition can have a transmission of greater than or equal to 4%, preferably 4.5 to 25%, more preferably 6 to 20%, determined according to ASTM D1003.

The thermoplastic composition can have a haze of less than or equal to 12%, preferably 5 to 11% more preferably 6 to 10%, determined according to ASTM D1003.

In some embodiments, the thermoplastic composition resists deformation when subjected to a lead-free solder reflow process at a temperature of greater than or equal to 250° C., or greater than or equal to 260° C., preferably 250 to 350° C., or more preferably 260 to 350° C.

In some embodiments, the thermoplastic composition exhibits a near-infrared (NIR) transmission of greater than or equal to 95%, preferably greater than or equal to 96%, more preferably greater than or equal to 97% at 950 nanometers (nm). An exemplary method for determining the NIR transmission at 950 nm is described in the working examples below.

In some embodiments, the thermoplastic composition exhibits a near-infrared (NIR) transmission of greater than or equal to 93%, preferably greater than or equal to 94%, more preferably greater than or equal to 95%, even more preferably greater than or equal to 96% at 850 nanometers (nm). An exemplary method for determining the NIR transmission at 850 nm is described in the working examples below.

In an embodiment, the thermoplastic composition comprises 10 to 90 wt. % of the first polyetherimide sulfone and 10 to 90 wt. % of the second polyetherimide sulfone. The composition has a melt index of 0.95 to 1.8 grams per minute, as determined according to ASTM D1238 at 367° C. using a 6.7 kilogram load; a glass transition temperature of 240 to 266° C.; a yellowness index of 140 to 200, determined according to ASTM D1925; a transmission of 4.5 to 25% determined according to ASTM D1003; and a haze of 5 to 11%, as determined according to ASTM D1003.

In an embodiment, the thermoplastic composition comprises 25 to 90 wt. % of the first polyetherimide sulfone, and 10 to 75 wt. % of the second polyetherimide sulfone. The composition has a melt index of 0.95 to 1.2 grams per minute, as determined according to ASTM D1238 at 367° C. using a 6.7 kilogram load; a glass transition temperature of 245 to 262° C.; a yellowness index of 150 to 195, as determined according to ASTM D1925; a transmission of 6 to 20%, as determined according to ASTM D1003; and a haze of 6 to 10% as determined according to ASTM D1003.

The thermoplastic compositions described herein can be particularly useful for the manufacture of various articles. For example, due to the good balance of thermal and optical properties as described above, the composition can be useful in articles for high heat optical applications. For example, an article comprising the above-described thermoplastic composition can be useful for an optical component, an optical lens, a microlens, an optical filter, an optical fiber, optoelectronic packaging, precision optical components, and the like.

Another embodiment is a method for improving the optical properties of a thermoplastic composition. The method comprises melt-mixing a first polyetherimide sulfone and a second polyetherimide sulfone. The first polyetherimide sulfone has a glass transition temperature of 250 to 290° C., preferably 260 to 270° C., and the second polyetherimide sulfone has a glass transition temperature of 230 to 249° C., preferably 240 to 249° C. In some embodiments, the first polyetherimide sulfone is a recycled polyetherimide sulfone. In some embodiments, the first polyetherimide sulfone is a recycled polyetherimide sulfone, and the second polyetherimide sulfone is a virgin polyetherimide sulfone. Melt-mixing the above-described components provides a thermoplastic composition. The thermoplastic composition includes the first polyetherimide sulfone in an amount of 10 to 90 wt. %, preferably 25 to 90 wt. %, more preferably 50 to 90 wt. %, based on the total weight of the composition. The thermoplastic composition include the second polyetherimide sulfone in an amount of 10 to 90 wt. %, preferably 10 to 75 wt. %, more preferably 10 to 50 wt. % based on the total weight of the composition.

The thermoplastic composition prepared by the above method exhibits a glass transition temperature of 231 to 289° C., preferably 240 to 266° C., more preferably 245 to 262° C., and a melt index of 0.7 to 2 grams per minute, preferably 0.95 to 1.8 grams per minute, more preferably 0.95 to 1.2 grams per minute determined according to ASTM D1238 at 367° C. using a 6.7 kilogram load. The thermoplastic composition advantageously exhibits one or more improved optical properties. For example, the thermoplastic composition can have a yellowness index of less than or equal to 200, preferably 140 to 200, more preferably 150 to 195, determined according to ASTM D1925. The thermoplastic composition can have a transmission of greater than or equal to 4%, preferably 5 to 25%, more preferably 6 to 20%, determined according to ASTM D1003. The thermoplastic composition can have a haze of less than or equal to 12%, preferably 5 to 11% more preferably 6 to 10%, determined according to ASTM D1003.

In some embodiments, the improvement in the optical properties of the composition can be determined relative to the optical properties of the first polyetherimide sulfone. For example, in some embodiments, the yellowness index of the thermoplastic composition is at least 1.5%, preferably 3 to 50%, more preferably 9 to 35% less than the yellowness index of the first polyetherimide sulfone, determined according to ASTM D1925. In some embodiments, the transmission of the thermoplastic composition is at least 6%, preferably 6 to 515%, more preferably 65 to 340% greater than the transmission of the first polyetherimide sulfone, determined according to ASTM D1003. In some embodiments, the haze of the thermoplastic composition is at least 5%, preferably 5 to 35%, more preferably 5 to 25% less than the haze of the first polyetherimide, determined according to ASTM D1003.

In a specific embodiment, the thermoplastic composition provided by the above method has a melt index of 0.7 to 2 grams per minute, as determined according to ASTM D1238 at 367° C. using a 6.7 kilogram load; a glass transition temperature of 231 to 289° C.; a yellowness index of less than or equal to 200, as determined according to ASTM D1925; a transmission of greater than or equal to 4%, as determined according to ASTM D1003; and a haze of less than or equal to 12%, as determined according to ASTM D1003.

In another specific embodiment, the thermoplastic composition provided by the above method has a melt index of 0.95 to 1.8 grams per minute, as determined according to ASTM D1238 at 367° C.; a glass transition temperature of 240 to 266° C.; a yellowness index of 140 to 200, as determined according to ASTM D1925; a transmission of 4.5 to 25%, as determined according to ASTM D1003; and a haze of 5 to 11%, as determined according to ASTM D1003.

In another specific embodiment, the thermoplastic composition provided by the above method has a melt index of 0.95 to 1.2 grams per minute, as determined according to ASTM D1238 at 367° C. using a 6.7 kilogram load; a glass transition temperature of 245 to 262° C.; a yellowness index of 150 to 195, as determined according to ASTM D1925; a transmission of 6 to 20%, as determined according to ASTM D1003; and a haze of 6 to 10%, as determined according to ASTM D1003.

Provided herein are thermoplastic compositions comprising a blend of polyetherimide sulfones, and having a desirable combination of thermal properties and optical properties. The thermoplastic compositions have good melt flow and glass transition temperatures of 231 to 289° C., and improved yellowness index, transmission, and haze. The thermoplastic compositions can advantageously incorporate a first polyetherimide sulfone that is a recycled polyetherimide sulfone. Thus, in addition to providing a thermoplastic composition having a good balance of properties, the present disclosure further provides a cost-effective approach to thermoplastic compositions including polyetherimide sulfones due to the use of a recycled component.

The thermoplastic compositions, methods, and articles are further illustrated by the following embodiments, which are non-limiting.

Embodiment 1: A thermoplastic composition comprising, based on the total weight of the thermoplastic composition, 10 to 90 wt. %, preferably 25 to 90 wt. %, more preferably 50 to 90 wt. % of a first polyetherimide sulfone having a glass transition temperature of 250 to 290° C., preferably 260 to 270° C.; and 10 to 90 wt. %, preferably 10 to 75 wt. %, more preferably 10 to 50 wt. % of a second polyetherimide sulfone having a glass transition temperature of 230 to 249° C., preferably 240 to 249° C.; wherein the composition has the following properties: a melt index of 0.7 to 2 grams per minute, preferably 0.95 to 1.8 grams per minute, more preferably 0.95 to 1.2 grams per minute, determined according to ASTM D1238 at 367° C. under a 6.7 kilogram load; a glass transition temperature of 231 to 289° C., preferably 240 to 266° C., more preferably 245 to 262; a yellowness index of less than or equal to 200, preferably 140 to 200, more preferably 150 to 195, determined according to ASTM D1925; a transmission of greater than or equal to 4%, preferably 4.5 to 25%, more preferably 6 to 20%, determined according to ASTM D1003; and a haze of less than or equal to 12%, preferably 5 to 11% more preferably 6 to 10%, determined according to ASTM D1003.

Embodiment 2: The thermoplastic composition of embodiment 1, wherein the thermoplastic composition resists deformation when subjected to a lead-free solder reflow process at a temperature of greater than or equal to 250° C., or greater than or equal to 260° C., preferably 250° C. to 350°, more preferably 260 to 350° C.

Embodiment 3: The thermoplastic composition of embodiments 1 or 2, wherein the thermoplastic composition has a near-infrared transmission of greater than or equal to 95%, preferably greater than or equal to 96%, more preferably greater than or equal to 97% at 950 nanometers, determined using a solution of the thermoplastic composition in N-methyl pyrrolidone having a concentration of 86.8 to 87.2 milligrams per milliliter.

Embodiment 4: The thermoplastic composition of any one or more of embodiments 1 to 3, wherein the first polyetherimide sulfone is a recycled polyetherimide sulfone.

Embodiment 5: The thermoplastic composition of any one or more of embodiments 1 to 4, wherein the first and second polyetherimide sulfones each independently comprise units of the formula

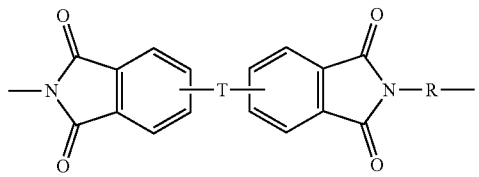

wherein R is a $C_{2-20}$ hydrocarbon group, T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing.

Embodiment 6: The thermoplastic composition of embodiment 5, wherein R is a divalent group of the formula

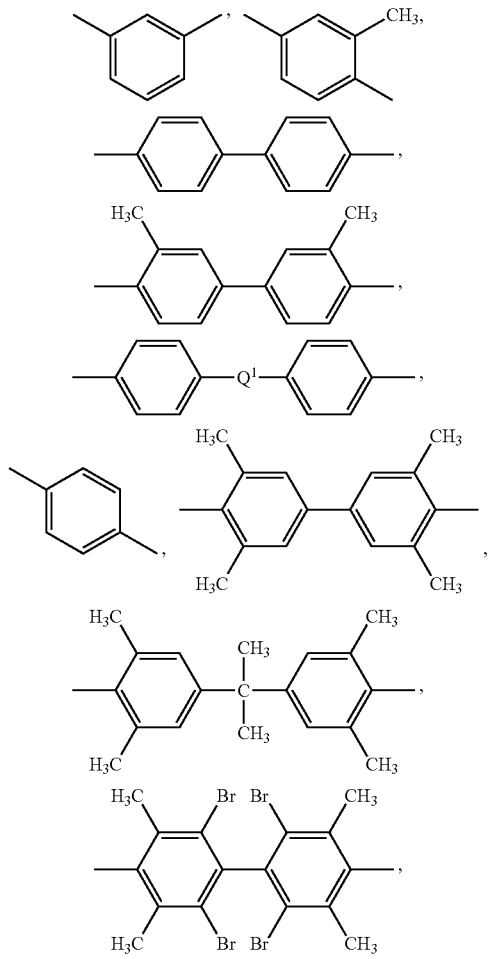

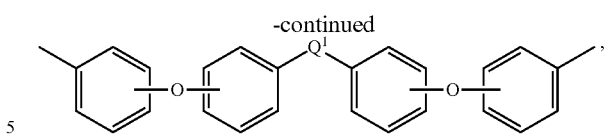

wherein $Q^1$ is —O—, —S—, —C(O)—, —SO$_2$—, —SO—, —$C_yH_{2y}$—, and a halogenated derivative thereof, wherein y is an integer from 1 to 5, or —$(C_6H_{10})_z$— wherein z is an integer from 1 to 4; and wherein Z is a group derived from a dihydroxy compound of the formula

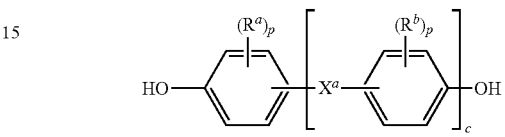

wherein $R^a$ and $R^b$ are each independently a halogen atom or a monovalent $C_{1-6}$ alkyl group; p and q are each independently 0, 1, 2, 3, or 4; c is 0 to 4; and $X^a$ is a single bond, —O—, —S—, —S(O)—, —SO$_2$—, —C(O)—, or a $C_{1-18}$ organic bridging group; wherein at least 10 mole percent of the R groups comprise a sulfone group.

Embodiment 7: The thermoplastic composition of embodiment 5 or 6, wherein R is 4,4'-diphenylene sulfone and Z is 4,4'-diphenylene isopropylidene.

Embodiment 8: The thermoplastic composition of any one or more of embodiments 1 to 7, further comprising one or more additives comprising a thermal stabilizer, a flame retardant, a hydrolysis stabilizer, an ultraviolet light stabilizer, a nucleating agent, a metal deactivator, a colorant, an antioxidant, or a combination comprising at least one of the foregoing.

Embodiment 9: The thermoplastic composition of any one or more of embodiments 1 to 8, wherein the composition comprises, 10 to 90 wt. % of the first polyetherimide sulfone; and 10 to 90 wt. % of the second polyetherimide sulfone; wherein the composition has: a melt index of 0.7 to 2 grams per minute, determined according to ASTM D1238 at 367° C. under a 6.7 kilogram load; a glass transition temperature of 231 to 289° C.; a yellowness index of less than or equal to 200, determined according to ASTM D1925; a transmission of greater than or equal to 4%, determined according to ASTM D1003; and a haze of less than or equal to 12%, determined according to ASTM D1003.

Embodiment 10: The thermoplastic composition of any one or more of embodiments 1 to 9, wherein the composition comprises, 10 to 90 wt. % of the first polyetherimide sulfone; and 10 to 90 wt. % of the second polyetherimide sulfone; wherein the composition has, a melt index of 0.95 to 1.8 grams per minute, determined according to ASTM D1238 at 367° C. under a 6.7 kilogram load; a glass transition temperature of 240 to 266° C.; a yellowness index of 140 to 200, determined according to ASTM D1925; a transmission of 4.5 to 25%, determined according to ASTM D1003; and a haze of 5 to 11%, determined according to ASTM D1003.

Embodiment 11: The thermoplastic composition of any one or more of embodiments 1 to 10, wherein the composition comprises 25 to 90 wt. % of the first polyetherimide sulfone; and 10 to 75 wt. % of the second polyetherimide sulfone; wherein the composition has a melt index of 0.95 to 1.2 grams per minute, determined according to ASTM D1238 at 367° C. under a 6.7 kilogram load; a glass transition temperature of 245 to 262° C.; a yellowness index of 150 to 195, determined according to ASTM D1925; a transmission of 6 to 20%, determined according to ASTM D1003; and a haze of 6 to 10%, determined according to ASTM D1003.

Embodiment 12: A method of manufacturing the thermoplastic composition of any one or more of embodiments 1 to 11, the method comprising melt-mixing the components; and extruding the components.

Embodiment 13: An article comprising the thermoplastic composition of any one or more of claims 1 to 11.

Embodiment 14: The article of embodiment 13, wherein the article is an optical component.

Embodiment 15: A method for improving the optical properties of a thermoplastic composition, the method comprising melt-mixing 10 to 90 wt. %, preferably 25 to 90 wt. %, more preferably 50 to 90 wt. % of a first polyetherimide sulfone having a glass transition temperature of 250 to 290° C., preferably 260 to 270° C.; and 10 to 90 wt. %, preferably 10 to 75 wt. %, more preferably 10 to 50 wt. % of a second polyetherimide sulfone having a glass transition temperature of 230 to 249° C., preferably 240 to 249° C.; to provide a thermoplastic composition having a glass transition temperature of 231 to 289° C., preferably 240 to 266° C., more preferably 245 to 262° C., and a melt index of 0.7 to 2 grams per minute, preferably 0.95 to 1.8 grams per minute, more preferably 0.95 to 1.2 grams per minute determined according to ASTM D1238 at 367° C. under a 6.7 kilogram load; and one or more of the following optical properties: a yellowness index of less than or equal to 200, preferably 140 to 200, more preferably 150 to 195, determined according to ASTM D1925; a transmission of greater than or equal to 4%, preferably 5 to 25%, more preferably 6 to 20%, determined according to ASTM D1003; and a haze of less than or equal to 12%, preferably 5 to 11% more preferably 6 to 10%, determined according to ASTM D1003.

Embodiment 16: The method of embodiment 15, wherein the yellowness index is at least 1.5%, preferably 3 to 50%, more preferably 9 to 35% less than the yellowness index of the first polyetherimide sulfone, determined according to ASTM D1925; the transmission is at least 6%, preferably 6 to 515%, more preferably 65 to 340% greater than the transmission of the first polyetherimide sulfone, determined according to ASTM D1003; and the haze is at least 5%, preferably 5 to 35%, more preferably 5 to 25% less than the haze of the first polyetherimide, determined according to ASTM D1003.

Embodiment 17: The method of embodiment 15 or 16, wherein the first polyetherimide sulfone is a recycled polyetherimide sulfone.

Embodiment 18: The method of any one or more of embodiments 15 to 17, wherein the thermoplastic composition has a melt index of 0.7 to 2 grams per minute, determined according to ASTM D1238 at 367° C. under a 6.7 kilogram load; a glass transition temperature of 231 to 289° C.; a yellowness index of less than or equal to 200, determined according to ASTM D1925; a transmission of greater than or equal to 4%, determined according to ASTM D1003; and a haze of less than or equal to 12%, determined according to ASTM D1003.

Embodiment 19: The method of any one or more of embodiments 15 to 18, wherein the thermoplastic composition has a melt index of 0.95 to 1.8 grams per minute, determined according to ASTM D1238 at 367° C.; a glass transition temperature of 240 to 266° C.; a yellowness index of 140 to 200, determined according to ASTM D1925; a transmission of 4.5 to 25%, determined according to ASTM D1003; and a haze of 5 to 11%, determined according to ASTM D1003.

Embodiment 20: The method of any one or more of embodiments 15 to 19, wherein the thermoplastic composition has a melt index of 0.95 to 1.2 grams per minute, determined according to ASTM D1238 at 367° C. under a 6.7 kilogram load; a glass transition temperature of 245 to 262° C.; a yellowness index of 150 to 195, determined according to ASTM D1925; a transmission of 6 to 20%, determined according to ASTM D1003; and a haze of 6 to 10%, determined according to ASTM D1003.

Further information is provided by the following non-limiting examples.

EXAMPLES

Materials for the following examples are listed in Table 1.

TABLE 1

| Abbreviation | Chemical Description | Source |
|---|---|---|
| TPI-R1 | Reground polyetherimide sulfone made from the reaction of 4,4'-diaminodiphenylsulfone with 3-chlorophthalimide, followed by reaction with a disodium salt of bisphenol A, having a glass transition temperature of 267° C., available as EXTEM XH1015. | SABIC |
| TPI-R2 | Reground and repelletized polyetherimide sulfone made from the reaction of 4,4'-diaminodiphenylsulfone with 3-chlorophthalimide, followed by reaction with a disodium salt of bisphenol A, having a glass transition temperature of 267° C., available as EXTEM XH1015. | SABIC |
| TPI-V | Virgin polyetherimide sulfone made from the reaction of 4,4'-diaminodiphenylsulfone with 3-chlorophthalimide, followed by reaction with a disodium salt of bisphenol A, having a glass transition temperature of 267° C., available as EXTEM XH1015. | SABIC |
| PEIS | Virgin polyetherimide sulfone made from the reaction of bisphenol A dianhydride with 4,4'-diaminodiphenylsulfone, having a glass transition temperature of 247° C., available as ULTEM XH6050. | SABIC |

Reground high Tg thermoplastic polyimide sulfone (TPI-R1) was obtained by grinding thermoplastic polyimide sprues and runners from manufacture of the polymer. The TPI-R1 was dried in an oven prior to use.

Reground, repelletized, high Tg thermoplastic polyimide sulfone (TPI-R2) was reground and then extruded at 345-360° C., and chopped into pellets following cooling in a water bath at 80-90° C. The TPI-R2 was dried in an oven prior to use.

The compositions of the following examples were prepared by compounding on a Toshiba TEM-37BS twin screw extruder, and chopped into pellets following cooling in a water bath at 80-90° C. Prior to injection molding, the pellets were dried in an oven.

Articles suitable for physical testing were prepared by injection molding using a 180-ton Demag injection molding machine.

Physical testing of the compositions was conducted according to the standards summarized in Table 2. Unless indicated otherwise, all tests are the tests in effect in the year 2010.

TABLE 2

| Property | Test Standard | Specimen Type | Units |
|---|---|---|---|
| Melt Index (MI) | ASTM D1238 | Pellets; under a 6.7 kilogram load at 367° C. | g/min |
| Heat Distortion Temperature (HDT) | ASTM D648 | Bar - 127 × 12.7 × 3.2 mm | ° C. |
| Vicat Softening Temperature | ASTM D1525 | Bar - 64 × 12.7 × 3.2 mm | ° C. |
| Yellowness Index (YI) | ASTM D1925 | Disk - 100 mm diameter, 3.2 mm thickness | — |
| Transmission | ASTM D1003 | Disk - 100 mm diameter, 3.2 mm thickness | % |
| Haze | ASTM D1003 | Disk - 100 mm diameter, 3.2 mm thickness | % |

In addition, glass transition temperature was determined using differential scanning calorimetry (DSC). Near infrared (NIR) transmission was determined by dissolving 2.175±0.05 grams of the composition in 25 milliliters of N-methyl pyrrolidone and measuring the NIR transmittance on the resultant solutions at 950 and 850 nanometers (nm). Yellowness index, transmission, and haze were each determined using a Minolta CM-3600d spectrophotometer meeting ASTM E-1164 requirements.

For each blend described below, the blend components were melt mixed in the amounts shown All components were melt-mixed, extruded, and tested as described above. Specific Examples are discussed below.

Comparative Examples 1-3 and Examples 1-5

Comparative Examples 1-5 are combinations comprising varying amounts of the TPI-R and the polyetherimide sulfone. Data for each composition is shown in Table 3.

Comparative Example 1 (CE1) illustrates the various physical properties of recycled TPI that has been re-ground, but not repelletized (TPI-R1). The glass transition temperature (Tg) of the TPI-R1 was 261.7° C., and the re-ground TPI-R1 exhibited a relatively high yellowness index (YI) of 203, and transmission and haze of 4.2% and 10.1% percent, respectively.

Comparative Example 2 (CE2) illustrates the various physical properties of recycled TPI that has been re-ground, and further has been re-pelletized (TPI-R2). CE2 shows a similar Tg of 263.8°, a YI of 210, and transmission and haze of 3.1% and 15% percent, respectively. CE1 and CE2 therefore illustrate the challenges in using recycled TPI for applications that require high heat, optically transparent materials.

Comparative Example 3 (CE3) is a low Tg polyetherimide sulfone (PEIS). The PEIS has a significantly decreased yellowness index of 123 compared to the recycled TPI. PEIS further has an increased transmission of 34.3%, and a decreased haze of 3.9%. Despite the desirable optical properties, CE3 exhibits a decreased Tg of 246.8° C., and thus may be unsuitable for some high heat applications.

Example 1, including TPI-R1 and only 10 weight percent of the PEIS exhibited properties similar to those observed for TPI-R1 alone (CE1). In general, yellowness index, transmission, and haze were each improved with increasing amounts of PEIS. Glass transition temperature generally decreased with increasing amounts of PEIS. Example 5, including TPR-1 and 90 weight percent PEIS, exhibited a Tg of 247.3° C., a YI of 143, a transmission of 22.3%, and a haze of 6.7%.

Examples 2 and 3 exhibited a desirable balance of thermal and optical properties. Example 2 exhibited a Tg of 259.3° C., and Example 3 exhibited a Tg of 254.1° C. Including 25 wt. % PEIS in Example 2 decreased the YI to 190 (compared to 203 and 210 for Comparative Examples 1 and 2). Further increasing the PEIS to 50 wt. % led to a decrease in YI to 176. The transmission of Examples 1 and 2 was increased by

TABLE 3

| Component | CE1 | CE2 | CE3 | E1 | E2 | E3 | E4 | E5 |
|---|---|---|---|---|---|---|---|---|
| TPI-R1 | 100 | 0 | 0 | 90 | 75 | 50 | 25 | 10 |
| TPI-R2 | 0 | 100 | 0 | 0 | 0 | 0 | 0 | 0 |
| PEIS | 0 | 0 | 100 | 10 | 25 | 50 | 75 | 90 |
| Properties | | | | | | | | |
| MI (g/min) | 1.1 | 1.02 | 1.27 | 1.78 | 0.99 | 1.09 | 1.16 | 1.16 |
| Tg (° C.) | 261.7 | 263.8 | 246.8 | 260.8 | 259.3 | 254.1 | 250 | 247.3 |
| YI | 203 | 210 | 123 | 200 | 190 | 176 | 157 | 143 |
| Transmission (%) | 4.2 | 3.1 | 34.3 | 4.5 | 6.1 | 9.4 | 16 | 22.3 |
| Haze (%) | 10.1 | 15 | 3.9 | 10.9 | 9.5 | 8.1 | 7.6 | 6.7 |
| Transmission at 950 nm (%) | 97 | 94.3 | 98.7 | 95.8 | 96.4 | 96.2 | 97.3 | 97.8 |
| Transmission at 850 nm (%) | 95.1 | 92.1 | 97.8 | 93.3 | 94.5 | 95.2 | 95.9 | 96.5 | about 45% and 124%, respectively, relative to the transmission of Comparative Example 1. The haze of Examples 1 and 2 was decreased by about 6% and 20%, respectively, relative to the haze of Comparative Example 1.

Each of the blends was also dissolved in N-methyl pyrrolidone (NMP), and NIR measurements were taken on the resultant solutions. As shown in Table 3, increasing the amount of PEIS included in the blended composition generally improved NIR transmission at 950 nm and 850 nm, with the blend of E5 approaching the transmission values obtained for CE3 (PEIS only) at 950 and 850 nm.

Examples 6-10

Additionally, blends prepared from virgin thermoplastic polyimide blended with a polyetherimide sulfone are also expected to have improved optical properties. The polyetherimide sulfone and the virgin thermoplastic polyimide can be melt mixed in the amounts shown in the table below. For each of the prophetic examples in Table 4, it is indicated whether or not the resulting blend would be expected to meet the various "critical to quality" (CTQ) standards for infrared-transparent lens applications. Each of the blends in Table 4 is given a rating of "pass" or "fail", based on the estimated glass transition temperature of the blend. The Tg can be estimated based on the weight percent of each component and the Fox Equation, shown below as Equation 1.

$$\frac{1}{Tg} = \frac{x_1}{Tg_1} + \frac{1-x_1}{Tg_2} \qquad (1)$$

In the above Equation, Tg is the glass transition temperature of the blend, $Tg_1$ and $Tg_2$ are the glass transition temperatures of the first and second components, respectively, and $x_1$ is the weight fraction of the first component. Blends that are expected to have a Tg of greater than or equal to 250° C., preferably greater than or equal to 255° C., are given a "pass" rating.

Blends that are expected to achieve at least 95% transmission at 950 nm, preferably at least 96% transmission at 950 nm are given a rating of "pass" in the table below.

TABLE 4

| Component | CE4 | E6 | E7 | E8 | E9 | E10 |
|---|---|---|---|---|---|---|
| TPI-V | 100 | 90 | 75 | 70 | 60 | 50 |
| PEIS | 0 | 10 | 25 | 30 | 40 | 50 |
| Properties | | | | | | |
| Transmission | PASS | PASS | PASS | PASS | PASS | PASS |
| YI | PASS | PASS | PASS | PASS | PASS | PASS |
| Tg | PASS | PASS | PASS | PASS | FAIL | FAIL |
| HDT | PASS | PASS | PASS | PASS | FAIL | FAIL |
| VICAT | PASS | PASS | PASS | PASS | FAIL | FAIL |

As shown in Table 4, compositions including greater than or equal to 70 wt. % of a virgin thermoplastic polyimide and up to 30 wt. % of a polyetherimide sulfone are expected to meet the critical standards set forth for high heat optically transparent materials.

In general, the compositions, methods, and articles may alternatively comprise, consist of, or consist essentially of, any appropriate components or steps herein disclosed. The compositions, methods, and articles may additionally, or alternatively, be formulated so as to be devoid, or substantially free, of any components, materials, ingredients, adjuvants or species used in the prior art compositions or that are otherwise not necessary to the achievement of the function and/or objectives of the present claims.

All ranges disclosed herein are inclusive of the endpoints, and the endpoints are independently combinable with each other. "Or" means "and/or". "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another embodiment", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($—CH_2—$) or propylene ($—(CH_2)_3—$)). "Alkenyl" and "alkenylene" mean a monovalent or divalent, respectively, straight or branched chain hydrocarbon group having at least one carbon-carbon double bond (e.g., ethenyl ($—HC=CH_2$) or propenylene ($—HC(CH_3)=CH_2—$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula $—C_6H_{2n-x}$ and $—C_nH_{2n-2x}—$ wherein x is the number of cyclization. "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P).

"Substituted" means that the compound or group is substituted with at least one (e.g., 1, 2, 3, or 4) substituents instead of hydrogen, where each substituent is independently nitro ($—NO_2$), cyano ($—CN$), hydroxy ($—OH$), halogen, thiol ($—SH$), thiocyano ($—SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl ($—S(=O)_2$-alkyl), $C_{6-12}$ arylsulfonyl ($—S(=O)_2$-aryl), or tosyl ($CH_3C_6H_4SO_2—$), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituents. All references are incorporated herein by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A thermoplastic composition comprising, based on the total weight of the thermoplastic composition,
   10 to 90 wt. % of a first polyetherimide sulfone having a glass transition temperature of 250 to 290° C.; and
   10 to 90 wt. % of a second polyetherimide sulfone having a glass transition temperature of 230 to 249° C.;
   wherein the composition has the following properties:
      a melt index of 0.7 to 2 grams per minute, determined according to ASTM D1238 at 367° C. under a 6.7 kilogram load;
      a glass transition temperature of 231 to 289° C.;
      a yellowness index of less than or equal to 200, determined according to ASTM D1925;
      a transmission of greater than or equal to 4%, determined according to ASTM D1003; and
      a haze of less than or equal to 12%, determined according to ASTM D1003.

2. The thermoplastic composition of claim 1, wherein the thermoplastic composition resists deformation when subjected to a lead-free solder reflow process at a temperature of greater than or equal to 250° C.

3. The thermoplastic composition of claim 1, wherein the thermoplastic composition has a near-infrared transmission of greater than or equal to 95%, determined using a solution of the thermoplastic composition in N-methyl pyrrolidone having a concentration of 86.8 to 87.2 milligrams per milliliter.

4. The thermoplastic composition of claim 1, wherein the first polyetherimide sulfone is a recycled polyetherimide sulfone.

5. The thermoplastic composition of claim 1, wherein the first and second polyetherimide sulfones each independently comprise units of the formula

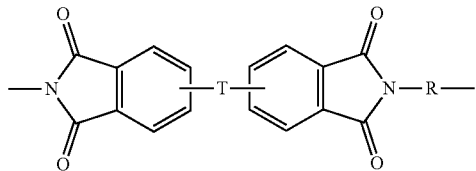

wherein
   R is a $C_{2-20}$ hydrocarbon group or a halogenated derivative thereof and at least 10 mole percent of the R groups comprise a sulfone group,
   T is —O— or a group of the formula —O—Z—O— wherein the divalent bonds of the —O— or the —O—Z—O— group are in the 3,3', 3,4', 4,3', or the 4,4' positions, and
   Z is an aromatic $C_{6-24}$ monocyclic or polycyclic group optionally substituted with 1 to 6 $C_{1-8}$ alkyl groups, 1-8 halogen atoms, or a combination thereof.

6. The thermoplastic composition of claim 5, wherein R is a divalent group of the formula

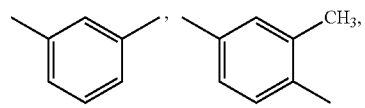

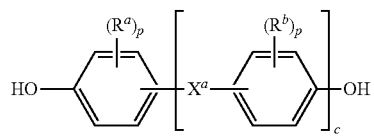

wherein $Q^1$ is —O—, —S—, —C(O)—, —SO$_2$—, —SO—, —$C_yH_{2y}$—, and a halogenated derivative thereof, wherein y is an integer from 1 to 5, provided that at least 10 mole percent of the R groups comprise a sulfone group; and
   wherein Z is a group derived from a dihydroxy compound of the formula wherein
   $R^a$ and $R^b$ are each independently a halogen atom or a monovalent $C_{1-6}$ alkyl group;
   p and q are each independently 0, 1, 2, 3, or 4;
   c is 0 to 4; and
   $X^a$ is a single bond, —O—, —S—, —S(O)—, —SO$_2$—, —C(O)—, or a $C_{1-18}$ organic bridging group.

7. The thermoplastic composition of claim 5, wherein R is 4,4'-diphenylene sulfone and Z is 4,4'-diphenylene isopropylidene.

8. The thermoplastic composition of claim 1, further comprising one or more additives comprising a thermal stabilizer, a flame retardant, a hydrolysis stabilizer, an ultraviolet light stabilizer, a nucleating agent, a metal deactivator, a colorant, an antioxidant, or a combination thereof.

9. The thermoplastic composition of claim 1, wherein the composition comprises,
   25 to 90 wt. % of the first polyetherimide sulfone; and
   10 to 75 wt. % of the second polyetherimide sulfone.

10. The thermoplastic composition of claim 1, wherein the composition comprises,
10 to 90 wt. % of the first polyetherimide sulfone; and
10 to 90 wt. % of the second polyetherimide sulfone;
wherein the composition has,
 a melt index of 0.95 to 1.8 grams per minute, determined according to ASTM D1238 at 367° C. under a 6.7 kilogram load;
 a glass transition temperature of 240 to 266° C.;
 a yellowness index of 140 to 200, determined according to ASTM D1925;
 a transmission of 4.5 to 25%, determined according to ASTM D1003; and
 a haze of 5 to 11%, determined according to ASTM D1003.

11. The thermoplastic composition of claim 1, wherein the composition comprises
25 to 90 wt. % of the first polyetherimide sulfone; and
10 to 75 wt. % of the second polyetherimide sulfone;
wherein the composition has,
 a melt index of 0.95 to 1.2 grams per minute, determined according to ASTM D1238 at 367° C. under a 6.7 kilogram load;
 a glass transition temperature of 245 to 262° C.;
 a yellowness index of 150 to 195, determined according to ASTM D1925;
 a transmission of 6 to 20%, determined according to ASTM D1003; and
 a haze of 6 to 10%, determined according to ASTM D1003.

12. A method of manufacturing the thermoplastic composition of claim 1, the method comprising
 melt-mixing the components; and
 extruding the components.

13. An article comprising the thermoplastic composition of claim 1.

14. The article of claim 13, wherein the article is an optical component.

15. A method for improving the optical properties of a thermoplastic composition, the method comprising
 melt-mixing
  10 to 90 wt. % of a first polyetherimide sulfone having a glass transition temperature of 250 to 290° C.; and
  10 to 90 wt. % of a second polyetherimide sulfone having a glass transition temperature of 230 to 249° C.;
 to provide a thermoplastic composition having:
 a glass transition temperature of 231 to 289° C., and
 a melt index of 0.7 to 2 grams per minute determined according to ASTM D1238 at 367° C. under a 6.7 kilogram load; and
 one or more of the following optical properties:
 a yellowness index of less than or equal to 200, determined according to ASTM D1925;
 a transmission of greater than or equal to 4%, determined according to ASTM D1003; and
 a haze of less than or equal to 12%, determined according to ASTM D1003.

16. The method of claim 15, wherein
the yellowness index is at least 1.5% less than the yellowness index of the first polyetherimide sulfone, determined according to ASTM D1925;
the transmission is at least 6% greater than the transmission of the first polyetherimide sulfone, determined according to ASTM D1003; and
the haze is at least 5% less than the haze of the first polyetherimide, determined according to ASTM D1003.

17. The method of claim 15, wherein the first polyetherimide sulfone is a recycled polyetherimide sulfone.

18. The method of claim 15, wherein the thermoplastic composition has
 a melt index of 0.7 to 2 grams per minute, determined according to ASTM D1238 at 367° C. under a 6.7 kilogram load;
 a glass transition temperature of 231 to 289° C.;
 a yellowness index of less than or equal to 200, determined according to ASTM D1925;
 a transmission of greater than or equal to 4%, determined according to ASTM D1003; and
 a haze of less than or equal to 12%, determined according to ASTM D1003.

19. The method of claim 15, wherein the thermoplastic composition has
 a melt index of 0.95 to 1.8 grams per minute, determined according to ASTM D1238 at 367° C.;
 a glass transition temperature of 240 to 266° C.;
 a yellowness index of 140 to 200, determined according to ASTM D1925;
 a transmission of 4.5 to 25%, determined according to ASTM D1003; and
 a haze of 5 to 11%, determined according to ASTM D1003.

20. The method of claim 15, wherein the thermoplastic composition has
 a melt index of 0.95 to 1.2 grams per minute, determined according to ASTM D1238 at 367° C. under a 6.7 kilogram load;
 a glass transition temperature of 245 to 262° C.;
 a yellowness index of 150 to 195, determined according to ASTM D1925;
 a transmission of 6 to 20%, determined according to ASTM D1003; and
 a haze of 6 to 10%, determined according to ASTM D1003.

* * * * *